United States Patent [19]

Toepker et al.

[11] Patent Number: 4,465,810

[45] Date of Patent: Aug. 14, 1984

[54] AGENTS FOR PREPARING CROSS-LINKED POLYMERS AND WATER-BASED PAINT COMPOSITIONS CONTAINING THOSE AGENTS

[75] Inventors: Dennis C. Toepker; Sheila S. Rodriguez; Joel I. Shulman, all of Cincinnati, Ohio

[73] Assignee: The Procter & Gamble Company, Cincinnati, Ohio

[21] Appl. No.: 394,076

[22] Filed: Jul. 1, 1982

[51] Int. Cl.³ .............................................. C08F 8/00
[52] U.S. Cl. ..................................... 525/285; 525/293; 525/301; 525/304; 525/308; 528/365; 528/366
[58] Field of Search ............... 525/285, 291, 301, 304, 525/308; 528/365, 366

[56] References Cited

U.S. PATENT DOCUMENTS

| | | | |
|---|---|---|---|
| 2,320,924 | 6/1943 | Gift | 260/42 |
| 2,916,469 | 12/1959 | Lal | 260/41 |
| 3,317,634 | 5/1967 | Longworth | 260/878 |
| 4,118,436 | 10/1978 | Craven | 260/826 |
| 4,133,793 | 1/1979 | Lewis et al. | 260/31.25 |
| 4,153,592 | 5/1979 | Burroway | |
| 4,226,752 | 10/1980 | Erickson et al. | 260/29.6 RB |
| 4,309,331 | 1/1982 | Graham | |
| 4,310,644 | 1/1982 | Miley | 528/365 |

OTHER PUBLICATIONS

U.S. patent application Ser. No. 290,918, Bush et al., filed Aug. 7, 1981.

*Primary Examiner*—Joseph L. Schofer
*Assistant Examiner*—Bernard Lipman
*Attorney, Agent, or Firm*—Steven J. Goldstein; Jack D. Schaeffer; Richard C. Witte

[57] ABSTRACT

A class of polymer precursor materials, which, under appropriate conditions, react to form cross-linked polymers, is disclosed. These materials contain a backbone segment, preferably a polyacrylate, and have pendant therefrom (1) reactive mono- or disubstituted olefinic groups, such as vinyl or allyl itaconate, and (2) water-solubilizing groups, such as the half ester of maleic acid. This class of materials, especially when combined with specifically-defined oxygen-activated catalyst systems, provides water-based paint compositions which exhibit film formation, strength and durability characteristics comparable to those of the best solvent-based paint formulations.

14 Claims, No Drawings

AGENTS FOR PREPARING CROSS-LINKED POLYMERS AND WATER-BASED PAINT COMPOSITIONS CONTAINING THOSE AGENTS

TECHNICAL FIELD

The present invention relates to water-based paint compositions utilizing specific cross-linked polymer films and the polymer precursor materials used in forming those films.

BACKGROUND OF THE INVENTION

Objects tend to be particularly vulnerable to wear and tear at their surfaces. The surfaces of objects left out in the open bear the brunt of the sun, rain, fog, dew, ice and snow. Under these conditions iron rusts, wood rots and road surfaces crack and disintegrate, just to name a few of the possible consequences. Even sheltered objects, such as those found in the home, suffer the wear and tear of daily use: scratches, dents and abrasions at their surfaces. To prevent or to minimize such damage, coatings designed to protect surfaces are frequently applied.

Coatings can also be used to decorate articles: to add color, luster, or to smooth out roughness or irregularities caused in the manufacturing process. Thus, in selecting a surface coating for a particular object there is a constant balancing which must go on between providing the necessary and appropriate protection and decoration functions. A wide variety of surface coatings is available, e.g., wallpaper, plastic sheets, chrome and silver plating. However, one of the most economical and versatile coatings is paint, which can be applied to any surface, however awkward its size or shape, by one process or another. Most paints contain liquid resinous or polymeric materials, known as binders. It is this component which, after conversion to a solid through the paint's drying process, provides a surface film having the necessary attributes of adhesion, flexibility, toughness and durability. Paints can generally be subdivided into two broad categories: convertible and non-convertible coatings. A convertible coating is a paint in which the binder is either a polymer precursor, a monomer or a partially polymerized material. Upon addition of a suitable initiator or exposure to radiant energy, such as ultraviolet or infrared radiation, the monomeric or partially polymerized component of the paint undergoes a polymerization reaction in which the binder is converted from a liquid or soluble state into an insoluble solid film. Non-convertible coatings, in contrast, do not undergo curing or chemical conversion reactions when they dry. For these paints, film formation involves loss or evaporation of a volatile solvent or dispersion medium and the concomitant deposition of the solid binder material; it is critical that this deposition be both uniform and continuous. See Boxall, et al., *Concise Paint Technology*, Chemical Publishing, New York, 1977, especially pages 29-57; and Turner, *Introduction to Paint Chemistry*, Chapman and Hall Ltd., 1967, especially pages 95-107.

BACKGROUND ART

Polymerization reactions involving simple monomers, i.e., vinyl cyclic acetals, in the presence of oxygen and cobalt salts, to produce polymeric materials are well-known in the art. See, for example, Hochberg, *J. Oil and Colour Chemists Assoc.*, 48, 1043-1068 (1965), U.S. Pat. No. 3,190,878, issued June 27, 1965, British Specification No. 916,563, published Jan. 23, 1963, and German Specification No. 1.148,033, published May 2, 1963, all assigned to E. I. duPont de Nemours & Co. The reaction of itaconic acid with vinyl acetate to form polyvinyl itaconate is also known. Akashi, *Kogyo Kagaku Zasshi*, 66, 156 (1963). Polymerization reactions of acrylic-terminated oligomers, initiated through the use of ultraviolet light, have been disclosed. Prane, *Polymer News*, 4, 239-241 (1978). The use of benzaldehyde, in the absence of oxygen, as an initiator for the free radical polymerization of methyl methacrylate has been disclosed. Imoto, et al., *J. Poly. Sci.*, 17, 385-392 (1979).

U.S. Pat. No. 4,244,850, Mylonakis, issued Jan. 13, 1981, describes a paint composition containing preformed aqueous emulsion acrylate copolymer particles to which have been attached ethylenically unsaturated side chains. The acrylate copolymer, formed by emulsion polymerization, is made from butyl acrylate, methyl methacrylate and methacrylic acid. The unsaturated side chain is attached to the preformed particles in the emulsion via a post reaction of the free carboxylic acid groups with glycidyl methacrylate.

U.S. Pat. No. 4,309,330, Ukita, et al., issued Jan. 5, 1982, describes an air curable coating wherein a high molecular weight polymer, in the form of an aqueous emulsion, is placed on the surface to be coated and cross-linking of the polymer resin is then initiated using a peroxide material, such as cyclohexanone peroxide, in the presence of air.

U.S. Pat. No. 4,261,872, Emmons, et al., issued Apr. 14, 1981, describes autoxidizable compositions comprising an unsaturated acid ester of a glycol monodicyclopentenyl ether, a condensation or vinyl addition polymer, a siccative and a volatile stabilizer. These compositions are usefully incorporated into high solid coatings for industrial use.

U.S. Pat. No. 4,242,243, Antonelli, et al., issued Dec. 30, 1980, describes high solids coating compositions containing a film-forming polymer comprised of a relatively high molecular weight alkyl methacrylate backbone (e.g., molecular weight about 20,000) and pendant fatty acid groups having relatively slow polymerization rates (e.g., linoleic acid).

U.S. patent application Ser. No. 290,918, Bush and Robbins, filed Aug. 7, 1981, describes polymer precursor materials which, under appropriate conditions, react to form cross-linked polymers, and which may be used in solvent or emulsion-based paint compositions. These materials contain a low molecular weight backbone segment, such as a polyacrylate, having pendant therefrom mono- or disubstituted olefinic groups, such as vinyl itaconate, with specific polymerization rates. The materials disclosed in this application are, generally, not water-soluble and are most effectively used in solvent-based or aqueous emulsion paint formulations.

U.S. patent application Ser. No. 290,908, Eickhoff and Robbins, filed Aug. 7, 1981, describes a class of oxygen-activated free radical polymerization catalysts, comprising specifically-defined autoxidizable cyclic hydrocarbons together with cobalt(II) compounds. It is taught that these oxygen-activated catalyst materials may be used effectively in paint and other coating compositions.

In formulating a paint, especially an interior wall paint, the key characteristics to be kept in mind, in addition to aesthetics, are convenience of use, durability and ease with which the painted surface may be cared for. It is particularly desirable to have a paint with a high solids content. Paints with a low solids content contain large amounts of solvent or water, which is generally considered undesirable by consumers since, ultimately, the water or solvent just evaporates off. The paint should also have excellent hiding properties (one-coat hiding is best); it should form a film which is stain resistant and easy to clean; it should have a high degree of surface continuity; and, finally, it should be durable, strong and resistant to wear. Generally, solvent-based paint compositions have been found to have such properties which are superior to water-based paints. However, because this type of paint formulation inherently requires the use of solvents, it is not generally acceptable for typical day to day painting jobs, such as do-it-yourself interior house painting. Therefore, it would be highly desirable to be able to formulate a water-based paint composition which has durability, hardness, solvent and stain resistance, cleaning capability, film continuity and mechanical stability properties which are comparable to solvent-based paint compositions.

It has now been found that by using the new polymer precursor materials of the present invention, especially in combination with the specifically-defined oxygen-activated catalysts herein, water-based paint compositions exhibiting physical properties comparable to solvent-based compositions may be formulated. In addition, these water-based paint compositions can provide a high gloss finish, in contrast to the water-based latex paint formulations which are currently commercially available.

SUMMARY OF THE INVENTION

The present invention relates to agents for preparing cross-linked polymers (i.e., polymer precursor materials, also known as resins or film-forming agents), especially useful in formulating water-based paint compositions, comprising:

(a) a major portion of a polymer selected from the group consisting of polyacrylates, polymethacrylates, polyesters, polyurethanes, polycarbonates, polyepoxides, polyvinyls, polystyrenes, or mixtures thereof (with polyacrylates being preferred), having a molecular weight of from about 1,000 to about 20,000, preferably from about 2,000 to about 10,000, this portion constituting the backbone of said agent;

(b) a minor portion of mono- or disubstituted olefinic groups pendant from said backbone, with the olefinic substituents on the groups being unpolymerized, said groups (preferably vinyl or allyl itaconate) having a polymerization rate constant between about $10 \times 10^{-4}$ and $1000 \times 10^{-4}$, preferably between about $10 \times 10^{-4}$ and about $600 \times 10^{-4}$, moles$^{-1/2}$ liter$^{1/2}$ minute$^{-1}$ at 70° C.; and (c) a minor portion of water-solubilizing groups pendant from said backbone, said groups selected from the half esters of maleic acid, fumaric acid, succinic acid, itaconic acid, phthalic acid, 5-norbornene-2,3-dicarboxylic acid, citraconic acid, glutaric acid, and mixtures thereof, with the half esters of maleic acid being preferred.

These agents, when used in the presence of appropriate initiators, undergo a free radical polymerization reaction forming cross-linking polymers. Also included within the scope of the present invention are water-based paint compositions utilizing these polymer precursor materials, comprising:

(a) from about 10% to about 60%, by weight, of solid pigment particles;

(b) from about 10% to about 60%, by weight, of a film-forming agent as described herein;

(c) an amount of an oxidative catalyst sufficient to cross-link from about 2% to about 60% of the pendant groups of said film-forming agent within about 48 hours upon exposure to air at a temperature of 20° C.;

(d) from about 1% to about 10% of a reactive diluent having the formula

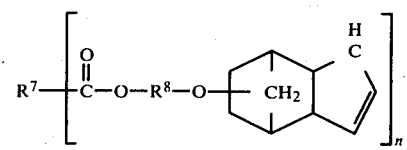

wherein n is 1 or 2, and wherein $R^7$, when n is 1, represents the unsaturated hydrocarbon residue of a monocarboxylic saturated acid or, when n is 2, the unsaturated hydrocarbon residue of a dicarboxylic acid, and $R^8$ represents an alkylene group having 2 to 12 carbon atoms or an oxaalkylene group having 4 to 12 carbon atoms and having one or more oxygen atoms joining distinct segments of the alkylene groups, each such segment having at least two carbon atoms; and (e) from about 10% to about 60% water.

The preferred oxidative catalysts for use in the present invention consist essentially of mixtures of peroxide-decomposing metal catalysts, such as a cobalt(II) compound, together with hydrocarbon compounds selected from the group consisting of

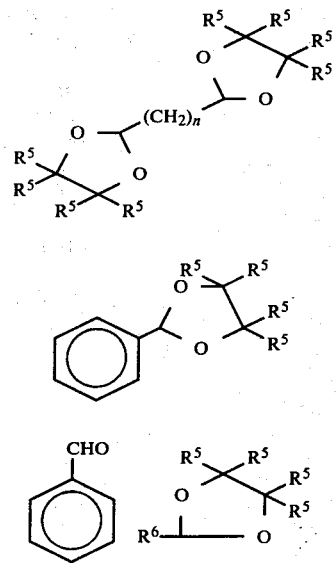

-continued

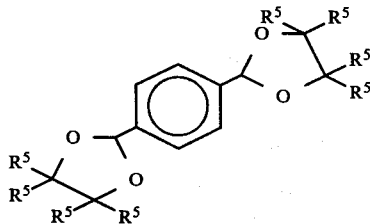

and mixtures thereof, wherein each $R^5$ is hydrogen, methyl, phenyl or COOH; $R^6$ is $C_1-C_{20}$ alkyl or alkenyl; and n is from 1 to 10.

DETAILED DESCRIPTION OF THE INVENTION

Polymer Precursor Materials

The essence of the present invention resides in a class of agents for preparing cross-linked polymers; these agents, when reacted under appropriate conditions, undergo a cross-linking polymerization reaction forming a strong, durable polymeric film which is the basis of the water-based paint compositions defined herein.

These agents are made up of three critical components: a major proportion of a low molecular weight backbone, a minor proportion of mono- or disubstituted olefinic groups pendant from that backbone, and a minor portion of water-solubilizing half ester groups pendant from that backbone. It is preferred that the ratio, by weight, of pendant olefinic groups to backbone is from about 0.05:1 to about 1:1, most preferably from about 0.1:1 to about 0.5:1. It is also preferred that the ratio, by weight, of pendant water-solubilizing groups to backbone is from about 0.02:1 to about 1:1, most preferably from about 0.05:1 to about 0.5:1.

The backbone segment of the agent is selected from the group consisting of polyacrylates, polymethacrylates, polyesters, polyurethanes, polycarbonates, polyepoxides, polyvinyls, polystyrenes, or mixtures thereof, having a molecular weight of from about 1,000 to about 20,000, preferably from about 2,000 to about 10,000, most preferably from about 5,000 to about 8,000; the preferred backbones being polymethacrylates and, especially, polyacrylates. The precise backbone structure to be used in a particular application should be based on the mechanical strength, environmental resistance, and facility to perform post-oligomer chemistry (i.e., the ability to attach pendant olefinic groups, pendant water-solubilizing groups, or other functional groups) required.

Examples of such backbone materials and procedures for synthesizing them are described in Boxall, et al., *Concise Paint Technology*, Chemical Publishing Co., Inc. New York, 1977, pages 29–57, incorporated herein by reference. Thus, for example, acrylic resins are polyvinylidene compounds having the general formula

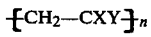

wherein X commonly may be H, $CH_3$, or $C_2H_5$, and Y is usually COOH, $COOCH_3$, $COO(CH_2)_3CH_3$ or $COOCH_2CH_2OH$.

The pendant cross-linking groups used herein are mono- or disubstituted olefinic groups, with the olefinic substitutents being unpolymerized. To be useful in the present invention, the pendant olefinic groups should be susceptible to free radical polymerization and polymerize at an acceptable rate, upon appropriate initiation, at room temperature in an oxygen atmosphere. Preferred pendant groups have a polymerization rate constant (measured at 70° C.) between about $10 \times 10^{-4}$ and about $1000 \times 10^{-4}$ especially between about $10 \times 10^{-4}$ and about $600 \times 10^{-4}$, most preferably from about $30 \times 10^{-4}$ to about $600 \times 10^{-4}$, moles$^{-1/2}$ liter$^{1/2}$ minute$^{-1}$. Particularly preferred olefinic groups are selected from 4-methyl-2-methylenesuccinate (monomethyl itaconate), 4-allyl-2-methylenesuccinate (beta-allyl itaconate), 1-vinyl-2-methylenesuccinate (alpha-vinyl itaconate), p-vinylbenzoic acid, monovinyl maleate, 4-vinyl-2-methylenesuccinate (betavinyl itaconate), N-phenyl-2-methylenesuccinimide, substituted N-phenyl-2-methylenesuccinimides, N-alkyl-N-allyl-2-methylenesuccinamates, N,N-diallyl-2-methylenesuccinamate, and mixtures thereof; vinyl and allyl itaconates, especially alpha-vinyl, beta-vinyl and beta-allyl itaconates, are particularly preferred pendant olefinic groups. Preferred beta-vinyl itaconate pendant olefinic groups are described in U.S. patent application Ser. No. 290,907, Bush, filed Aug. 7, 1981, incorporated herein by reference. N-alkyl-N-allyl-2-methylenesuccinamates have the formula

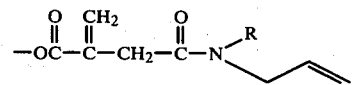

wherein R is $C_1-C_6$ alkyl; N,N-diallyl-2-methylenesuccinamate has the formula

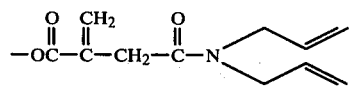

The polymerization rate constant (K') of a specific monomer or, as used herein, pendant group is equal to the rate of disappearance of the particular monomer (rate) divided by the product of the initial concentration of that monomer in solution (M) and the square root of the concentration of azobisisobutylnitrile (AIBN) in the system being tested.

$$K' = \frac{\text{rate}}{[M][AIBN]^{\frac{1}{2}}} \qquad (1)$$

The rate is determined by heating a solution of monomer (the pendant olefinic group) and AIBN at 70° C. and determining the change in concentration of monomer with time (mole/liter minute) using chlorobenzene as the solvent under an argon atmosphere. K' is usually determined with monomer concentrations in the range of from about 0.02 to about 2 mole/liter, while the concentration of AIBN is about 10 mole percent of the monomer concentration. For example, the polymerization rate constant for dimethyl itaconate was determined in the following manner. A chlorobenzene solution containing 2.23 mole/liter dimethyl itaconate, 0.23 mole/liter azobisisobutylnitrile, and 2.0 mole/liter dimethyl adipate (internal standard for gas chromatographic analysis) was subjected to three freeze-pump-thaw cycles, using liquid nitrogen to cool the sample and argon as the inert gas. After all the air had been replaced with argon, the reaction solution was placed in a bath at 70.0° C. and the disappearance of dimethyl itaconate was followed by gas chromatography until 20% of the dimethyl itaconate had polymerized. A plot of time vs. concentration of dimethyl itaconate yielded the rate data: rate (in mole/liter minute) is the slope of the plot. $K'$ can then be calculated using equation (1).

The following table illustrates the polymerization mixture of acids. The most preferred resins of the present invention utilize half esters of maleic acid as the water-solubilizing group.

Preferred agents of the present invention (i.e., those having a polyacrylate or polymethacrylate backbone and vinyl itaconate or allyl itaconate pendant olefinic groups) have the formulae

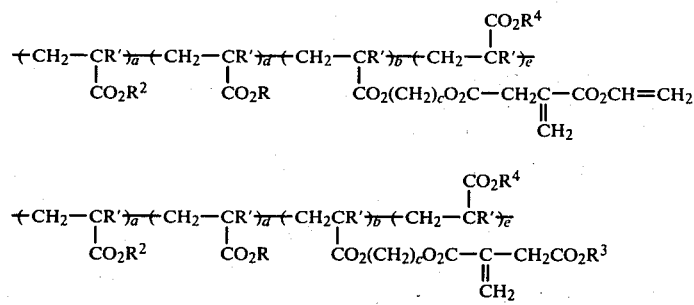

rate constants of a range of pendant olefinic groups, some falling inside and some falling outside the scope of the present invention.

| POLYMERIZATION RATE CONSTANTS OF PENDANT GROUPS (AT 70° C.) | |
|---|---|
| ($\times 10^4$ mole$^{-1}$ liter$^1$ minute$^{-1}$) | |
| Alpha-allyl itaconate | 24 |
| vinyl succinate | 26 |
| beta-allyl itaconate | 34 |
| allyl maleate | 35 |
| dimethyl itaconate | 38 |
| vinyl octanoate | 54 |
| monomethyl itaconate | 107 |
| alpha-vinyl itaconate | 111 |
| p-vinylbenzoic acid | 113 |
| vinyl maleate | 114 |
| methyl methacrylate | 173 |
| phenyl alpha-methylenesuccinimide | 495 |
| beta-vinyl itaconate | 563 |
| vinyl chloride | 8,480 |
| vinyl acetate | 8,608 |
| methyl acrylate | 18,944 |

Materials with polymerization rate constants below the defined range polymerize too slowly to be practical for use in water-soluble paint compositions, while the materials with higher polymerization rate constants (e.g., methyl acrylate, vinyl chloride, and vinyl acetate) polymerize in a rapid and uncontrolled manner, making their use unfeasible.

The pendant water-solubilizing groups used in the present invention are half esters of dicarboxylic acids which are capable of forming cyclic anhydrides. This includes a small, well-defined group of acid materials which are well-known to those skilled in the art. These acids include maleic acid, succinic acid, itaconic acid, phthalic acid, 5-norborene-2,3-dicarboxylic acid, glutaric acid and citraconic acid. Maleic acid is capable of forming a cyclic anhydride; however, it can be isomerized around its double bond to form fumaric acid, which is not capable of forming a cyclic anhydride. Because fumaric acid is an isomer of maleic acid, which is capable of forming a cyclic anhydride, fumaric acid is useful in the resins of the present invention. The actual pendant solubilizing groups included in the resins of the present invention are half esters of the acids enumerated above. The solubilizing groups in a given resin may comprise half esters of a single acid or half esters of a wherein $R'$ is hydrogen or methyl (preferably hydrogen), $R^2$ is $C_1$–$C_5$ alkyl, preferably methyl; $R^3$ is vinyl or allyl; $R^4$ is $C_1$–$C_5$ hydroxyalkyl, preferably hydroxyethyl; $R$ is a half ester of maleic acid, fumaric acid, succinic acid, itaconic acid, phthalic acid, 5-norbornene-2,3-dicarboxylic acid, citraconic acid, or mixtures thereof; a is from about 10 to about 100, preferably from about 16 to about 60; b is from about 0.1a to about a, preferably from about 5 to about 15; c is from about 1 to about 5; d is from about 0.1b to about b, preferably from about 1 to about 15; and e is from 0 to about b, preferably from about 1 to about 15.

The agents of the present invention may be prepared using conventional methods as, for example, in the following manner:

A reaction flask is continually flushed with inert gas (e.g., argon) and charged with the following ingredients: the backbone resin, the acid chloride of the olefinic pendant group and ethyl acetate. To this solution is added dropwise, with vigorous stirring, an ethyl acetate solution of an organic base capable of taking up the liberated HCl and also of catalyzing the reaction, such as triethylamine. Inorganic bases, such as calcium carbonate or ion exchange resins, can be used instead of the organic base but they additionally require a base catalyst, such as pyridine or triethylamine. Where an inorganic base is used, the olefinic pendant group is added dropwise to a well-stirred dispersion of the insoluble base, the backbone resin and the base catalyst in ethyl acetate. After the base addition is complete, the reaction is worked up immediately in the following manner: the reaction mixture is filtered to remove precipitated base (amine) hydrochloride salt, washed with saturated sodium bicarbonate to remove any unreacted acid chloride pendant groups or free HCl, and concentrated to remove the etyl acetate solvent. This reaction yields the capped resin backbone comprising the backbone section with pendant olefinic groups. A solution of this capped resin in ethyl acetate is then formed in a dry flask equipped with a mechanical stirring device and the cyclic acid anhydride corresponding to the desired half ester water-solubilizing group is added to this solution. The reaction is stirred at room temperature until NMR analysis indicates a complete reaction of the anhydride. The solvent is then partially evaporated yielding the resin materials of the present invention.

In order to make the resins water-soluble, they should be neutralized with a base in an amount sufficient to neutralize from about 50% to about 100% of the free acid groups in the resin. A wide variety of bases may be used for this neutralization process to provide water-solubility; such useful materials include amines, alkali metal hydroxides, an alkaline earth hydroxides, especially lithium hydroxide or mixtures of lithium hydroxide with calcium hydroxide.

Catalysts

The polymer precusor materials of the present invention are usefully combined with catalyst materials (i.e., latent radical initiators) which, when initiated in an appropriate manner, as by introduction of oxygen, ultraviolet radiation, heat or light into the system, cause the precursor materials to undergo free radical polymerization forming a cross-linked polymer film. Although any type of catalyst effective in a free radical polymerization reaction may be used, when formulating paint compositions, it is especially preferred to combine the polymer precursor materials of the present invention with a catalytic amount of an oxidative catalyst sufficient to cross-link from about 2% to about 60%, preferably at least about 10%, most preferably at least about 20% of the pendant groups of the precursor within about 48 hours upon exposure to air at a temperature of about 20° C. Compositions comprising the precursor materials and such oxidative catalysts generally contain from about 0.5% to about 10%, by weight, of the catalyst.

An especially preferred catalyst for use in the present invention is a two-component system consisting of: (a) a specially-defined hydrocarbon component and (b) a peroxide-decomposing metal catalyst. In order for a hydrocarbon to function effectively in such catalyst systems, it first has to be capable of autoxidation to form a hydroperoxide. In a hydrocarbon $R_1R_2R_3CH$, the selection of substituents $R_1$, $R_2$ and $R_3$ so as to lower the dissociation energy of the carbon-hydrogen bond will be essential to performance in the catalyst system; thus, hydrocarbons which readily autoxidize are most useful in the catalysts of the present invention. However, it is not sufficient to have a hydrocarbon which autoxides rapidly; it is also essential that the intermediate hydroperoxide formed decompose homolytically at a rate faster than it is being formed. The hydrocarbon component useful in the present invention is most preferably selected from the group consisting of

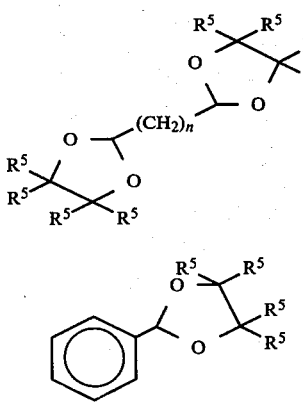

-continued

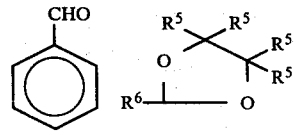

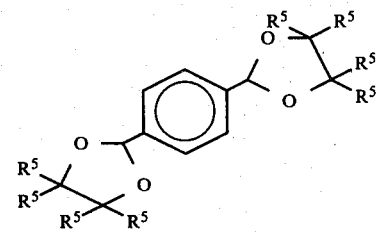

and mixtures thereof, wherein each $R^5$ is hydrogen, methyl, phenyl or COOH; $R_6$ is $C_1-C_{20}$ alkyl or alkenyl; and n is from 1 to 10. The aromatic groups may be substituted; however, replacement of the oxygen atoms in the molecules with nitrogen atoms will significantly reduce the efficacy of these catalyst systems. Preferred components are those having the formulae

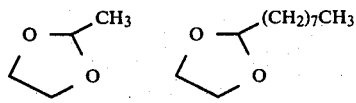

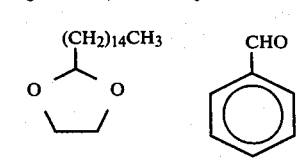

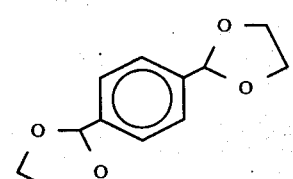

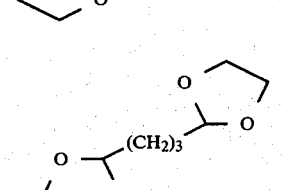

1,3-bis(1,3-dioxolan-2-yl)propane and mixtures thereof. A preferred class of hydrocarbon components is the 2-alkyl substituted 1,3-dioxolanes, with 1,3-bis(1,3-dioxolan-2-yl)propane (BDOP) being especially preferred.

The peroxide-decomposing metal catalyst component may be any polyvalent metal-containing complex or salt that catalyzes the oxidative curing of the resins herein. Examples of these materials are various polyvalent metal salts including copper, manganese, lead, cobalt, iron and zirconium as the cation. Simple inorganic salts, such as halides, chlorides, nitrates and sulfates, are useful. However, it is frequently preferred to use salts of organic acids, such as the acetylacetonates, acetates, propionates, butyrates, octanoates, decanoates, and the like. This component may also be a complex reaction product of metal oxides, acetates, or borates and vegetable oils. Generally, the most useful catalyst components are salts of naphthenic acids or of $C_8$-$C_{30}$ aliphatic acids. Examples of the aliphatic or fatty acid component or anion of this component include naphthenic acids, resinic acids, tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid, and abietic acid. Mixtures of various peroxide decomposing components mentioned in the *Encyclopedia of Chemical Technology*, Kirk-Othmer, Volume 5, pages 195–205, published by Interscience Encyclopedia, Inc., New York (1950), incorporated herein by reference, may also be used.

The peroxide-decomposing metal catalyst component used herein is preferably a cobalt(II) compound. Such compounds are well-known in the art and most frequently are cobalt(II) salts of carboxylic acids or a 2,4-pentanedione complex of cobalt(II). Examples of such compounds include cobalt(II) dipivalolylmethane, cobalt(II) acetylacetonate, cobalt(II) acetate, cobalt(II) decanoate, cobalt(II) octanoate, cobalt(II) naphthenate, and mixtures thereof. In forming these preferred catalysts, the mole ratio of hydrocarbon component to transition metal catalyst (e.g., the cobalt(II), itself) is from about 1 to about 1,000, most preferably from about 2 to about 100. These preferred catalyst systems are described and claimed in U.S. patent application Ser. No. 290,908, Eickhoff and Robbins, filed Aug. 7, 1981, incorporated herein by reference.

The catalyst system, as defined above, may additionally contain a reactive diluent to assist in the controlled catalysis of the oxygen-initiated free radical polymerization reaction. The reactive diluents useful in the present invention are monomeric compounds of the class defined by the general formula

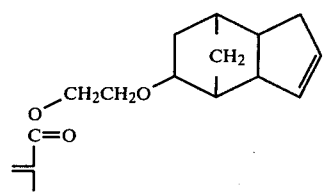

wherein n is 1 or 2, and wherein $R^7$, when n is 1, represents (1) the unsaturated hydrocarbon residue of a monocarboxylic unsaturated acid, e.g., acrylic, methacrylic, and crotonic acid, or (2) when n is 2, the unsaturated hydrocarbon residue of a dicarboxylic acid, e.g., itaconic, fumaric, maleic, or alpha-methylene glutaric acid; and $R^8$ represents an alkylene group having 2 to 12, preferably 2 to 6, carbon atoms or an oxaalkylene group having 4 to 12 carbon atoms and having one or more oxygen atoms joined by distinct segments of the alkylene group, each such segment having at least two carbon atoms. $R^8$, in preferred embodiments, represents the hydrocarbon residue of a $C_2$-$C_6$ diol or $C_2$-$C_6$ glycol containing one or two oxygen atoms joining two or three carbon atom segments of the alkylene groups. The ester-ether chain may be connected to either the 5-position or 6-position of the ring nucleus. In fact, the reactive diluent may comprise a mixture of the two compounds in which part of the ester-ether chain is substituted in the 5-position and part is substituted in the 6-position.

The preferred reactive diluents for use herein are those in which the ester is derived from acrylic acid or methacrylic acid and the $R^7$ group is $H_2C\!=\!C(R^9)\!-\!$, wherein $R^9$ is H or $CH_3$. The reactive diluents useful herein are fully described and exemplified in U.S. Pat. No. 4,261,872, Emmons, et al., issued Apr. 14, 1981, incorporated herein by reference. In compositions containing the resins and catalyst systems defined herein, the reative diluent, when used, is incorporated at levels of from about 1% to about 10%, by weight, of the composition. A particulaly preferred reactive diluent compound for use herein is one having the formula

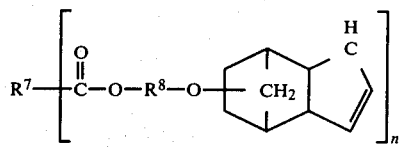

which is commercially available under the tradename Reactive Diluent QM-657 from the Rohm and Haas Company, Philadelphia, Pa.

The catalyst system, as defined above, may also additionally contain a storage stabilizer component. Storage stabilizers (i.e., polymerization inhibitors) act to assure that the free radical polymerization will not occur until the resin and catalyst mixtures have been exposed to oxygen or another appropriate initiator; however, they should not interfere with the operation of the catalyst system when polymerization is desired. Such storage stabilizers generally act by scavenging and tying up any itinerant free radicals which may be present in the system. Thus, for example, in formulating a paint composition of the present invention, the resin, the catalyst and a storage stabilizer could all be included in the containers of paint; this assures that the polymerization will not take place until the paint is applied to a surface and exposed to oxygen. Useful storage stabilizers include tetraphenylverdazyl, described in U.S. patent application Ser. No. 290,918, Bush and Robbins, filed Aug. 7, 1981, incorprated herein by reference, as well as the volatile low molecular weight ketone-oximes and aldehydeoximes, disclosed in U.S. Pat. No. 4,261,872, Emmons, et al., issued Apr. 14, 1981, and U.S. Pat. No. 4,071,489, Emmons, et al., issued Jan. 31, 1978, both incorporated herein by reference. Specific examples of such storage stabilizers include methyl ethyl ketone-oxime, methyl butyl ketone-oxime, 5-methyl-3-heptanone-oxime, cyclohexanone-oxime and butyraldehyde-oxime. When such storage stabilizers are used in compositions, such as paint compositions, incorporating both the resin and the catalyst components described herein, up to about 2%, and preferably between about 0.05% to about 1%, of the storage stabilizer component may be utilized.

Paint Compositions

The polymer precursor materials described in the present application are especially adapted for use in formulating water-based paint compositions. The compositions are applied to a surface, where the polymer precursor materials polymerize in situ, forming the paint film. Thus, the key is to use a water-soluble polymer precursor which will polymerize in situ, upon appropriate initiation, in an oxygen atmosphere at room temperature. The particular polymer precursor (i.e., the identity of its backbone segment, as well as the nature and amount of its pendant groups), initiator or storage stabilizer (if any) selected will affect the speed and completeness of the in situ polymerization. These paint compositions exhibit outstanding aesthetic and performance properties, including high levels of surface continuity, stain resistance, and durability, as well as strength and resistance to wear. The properties exhibited by the water-based paint compositions of the present invention are, in fact, comparable to those exhibited by the best solvent-based compositions on the market today. In addition, the water-based paint compositions herein are capable of delivering a high gloss finish, which is quite unusual for water-based formulations.

The water-based compositions of the present invention comprise:

(a) from about 10% to about 60%, preferably from about 10% to about 30%, by weight, of solid pigment particles;

(b) from about 10% to about 60%, preferably from about 15% to about 30%, by weight, of a film-forming agent as described above;

(c) an amount, preferably from about 0.1% to about 10%, of an oxidative catalyst sufficient to crosslink from about 2% to about 60% of the pendant olefinic groups of said film-forming agent within about 48 hours upon exposure to air at a temperature of 20° C.;

(d) from about 1% to about 10% of a reactive diluent as described above; and (e) from about 10% to about 60%, preferably from about 15% to about 40%, by weight, of water.

When the catalyst utilized in the paint composition is of the type described above, the compositions generally will contain from about 1% to about 5%, by weight, of the hydrocarbon catalyst compound and from about 0.01% to about 5%, by weight, of the metal catalyst compound (or, for example, if a cobalt(II) compound is used, sufficient cobalt compound to yield from about 0.01% to about 1% of cobalt(II) in the composition).

The paint compositions are formulated in the conventional manner known in the art; the particular amount and components included in any given composition being dependent upon such factors as the likely service environment of the paint, the desired life expectancy of the coating, the method of application, the color, the surface finish, the desired drying time and the desired cost of the formulation. In addition to inclusion in paint compositions of the type described above, the film-forming agents and catalysts may be incorporated into standard latex paints (such that they comprise from about 10% to about 50% of the latex paint composition) to improve the properties of such paints.

In order to incorporate the resin materials herein into water-based paint compositions, it is desirable to make the resins water-soluble by neutralizing them with a base in an amount sufficient to neutralize from about 50% to about 100% of the free acid groups in the resin. A wide variety of bases may be used for this neutralization process; such useful materials include amines, alkali metal hydroxides and alkaline earth hydroxides. the amines are particularly useful when the paints are being formulated for industrial use and are cured by baking at high temperatures. However, in formulating paint compositions for everyday use (such as interior paints), it is important, for safety and aesthetic reasons, to limit the amount of amines contained in the compositions; for such compositions, neutralization with lithium hydroxide or mixtures of lithium hydroxide and calcium hydroxide is preferred.

A pigment may be defined as a solid material, in the form of small discrete particles, which is incorporated into, but remains insoluble in, the paint medium. A pigment confers a number of attributes to a paint film, notably color and opacity, while influencing the degree of resistance of the film to light, contaminants and other environmental factors, as well as modifying the flow properties of the liquid paint. Pigments may be either organic or inorganic in origin. Inorganic pigments may be conveniently classified by color. Those useful in the present invention include white pigments, such as titanium dioxide, zinc oxide, antimony oxide, white lead, and basic lead sulfate; red pigments, including red iron oxide, red lead, cadmium red, and basic lead silicochromate; yellow pigments, including lead chromates, zinc chromates, yellow iron oxides, cadmium yellow, and calcium plumbate; green pigments, including chromium oxide and lead chrome green; blue pigments, such as Prussian blue and ultramarine blue; and black pigments, such as black iron oxide. Of course, mixtures of various pigments may be used. The pigments are used in combinations and amounts based on factors such as color and color intensity desired, intended use of the paint, and the identity and properties of other components used in the paint formulation. Titanium dioxide, because of its non-toxicity and its very high stability, is a particularly preferred pigment for use in the paint compositions of the present invention.

Metallic pigments useful in the present invention include aluminum powder, zinc powder and lead powder. Organic pigments which may be used in the paint compositions include red pigments, such as toluidine red and arylamide red; yellow pigments, such hansa yellow and benzidine yellow; green pigments, such as pigment green D; blue pigments, such as phthalocyanine blue; and black pigments, such as carbon black.

There is a further class of paint additives that is also insoluble in the paint medium but which imparts little or no opacity or color to the film into which it is incorporated. These materials are known as extenders and they are all of inorganic origin. Extenders may replace part of the pigment used (e.g., calcium carbonate, silica) or may be incorporated into paints to modify the flow properties, gloss, surface topography and the mechanical and permeability characteristics of the film. Extenders useful in the present invention include barytes, whiting, china clay, mica, and talc.

The compositions of the present invention additionally may comprise up to about 25% of a cosolvent to help dissolve the resin component and to modify the viscosity of the coating. To be effective, the solvent must fullfill certain criteria. It must yield a solution of viscosity to suit the storage and application requirements of the paint. It should have the correct evaporation rate and it must deposit a film with optimum characteristics. It should also have an acceptable odor, minimal toxicity, and a reasonable cost. In formulating a paint with convertible resins, as is the case in the present invention, solvents are primarily added to enable the coating to be applied by the appropriate technique. The two most important characteristics of solvents for use in paint compositions are solvent power (ability to dissolve specific resins) and evaporation rate (the relative speed with which they leave the coating after application). Solvents conventionally known for use in paint compositions are useful in the compositions herein; such solvents include, but are not limited to, 2-ethylhexyl acetate, amyl acetate, isobutyl acetate, n-propyl acetate, Ektasolve ® DB (diethylene glycol monobutyl ether), Ektasolve ® DE acetate (diethylene glycol monoethyl ether acetate), Carbitol ® acetate, Cellosolve ® acetate, Texanol ® ester alcohol (2,2,4-trimethylpentanediol-1,3-monoisobutyrate), and mixtures thereof. Preferred cosolvents are selected from ethyl acetate, ethylene glycol diacetate, ethanol, N-methylpyrrolidone and mixtures thereof. Preferred compositions contain from about 5% to about 20% of this cosolvent.

Plasticizers may also be included in the paint compositions defined herein. The main function of a plasticizer is to increase and maintain film flexibility, particularly in paints based on binders which, in the absence of plasticization, tend to be brittle. Plasticizers can either be added physically to the paint composition, generally during manufacture, or they can be chemically incorporated into the polymer molecule by copolymerization techniques. Useful plasticizers include dibutyl phthalate, dioctyl phthalate, triphenyl phosphate, tricresyl phosphate, trichloroethyl phosphate, butyl stearate, and chlorinated paraffins.

Additional components, conventionally used in paint formulations, may be incorporated into the paint compositions of the present invention at their art-established usage levels. Such components include, but are not limited to, dyes, drying accelerators; biocides, such as complex compounds of phenol, formaldehyde and, less commonly, mercury; storage stabilizers, as defined hereinbefore; fungicides, such as zinc oxide, barium metaborate, organomercurials, organotin compounds, dithiocarbamates and dichlorofluamide; antifouling agents, such as metallic copper, copper suboxide, tributyltin oxide an mercuric oxide; pigment dispersing agents; paint viscosity modifiers, such as natural clays, thixotropic resins and cellulose ethers; flatting agents; flow control agents; anti-sag agents; surface conditioners; yield strength agents; and pigment anti-settling agents, such as surface-active agents, most notably soya lecithin at levels of about 1% of the pigment content.

As used herein, all percentages and ratios given are by weight, unless otherwise specified.

The following non-limiting examples illustrate the resins and compositions of the present invention.

EXAMPLE I

Resin Backbone Preparation

The backbone portion of the resin materials described in the present application may be prepared using procedures known in the art. See Sorenson and Campbell, *Preparative Methods of Polymer Chemistry*, 2nd Edition, Interscience Publishers, 1968, page 154, incorporated herein by reference. Methyl acrylate (MA)/hydroxyethyl acrylate (HEA) backbone materials were made in the following manner.

A two-liter jacketed reaction vessel was fitted with the following: mechanical agitation device (teflon stir paddle), condenser, thermometer, addition funnel, and positive argon atomsphere. Under argon atmosphere at room temperature, the dry vessel was charged with 374 g (4.34 moles) methyl acrylate, 12.1 g (0.104 moles) 2-hydroxyethyl acrylate, 430 g ethyl acetate, 29.71 g (0.147 moles) dodecylmercaptan, and 5.34 g (0.0325 moles) azobisisobutyronitrile. Under argon atmosphere, a solution of 238.7 g (2.05 moles) 2-hydroxyethyl acrylate in 430 g ethyl acetate was charged to the addition funnel. The reaction mixture was then heated; when the temperature reached 37° C., the addition of the 2-hydroxyethyl acrylate solution in ethyl acetate was begun. The reaction temperature rose to 55°–60° C. (exothermic) within 5–10 minutes and this temperature was maintained via jacket temperature control over the entire addition period (40 minutes). Upon complete addition, the reaction was warmed to reflux and held for about 16 hours to decompose residual azobisisobutyronitrile. Partial evaporation of the solvents afforded a solution of resin backbone (about 608 grams) in ethyl acetate (588 grams).

A solution of 70 grams resin backbone in 30 grams ethyl acetate was a Brookfield viscosity of about 400 centipoise. Molecular weight determination of the polymer by calibrated gel permeation chromatography indicated $M_n$, 1500; $M_w$ 3800; $M_z$ 8000; peak, 3500. The general polymer structure of the compounds prepared in this example is as follows.

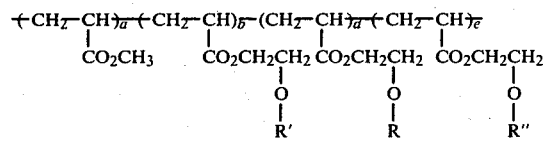

In the backbone material prepared, above, $R'=H$, and the weight ratio $a:b:d:e=8:4:0:0$.

Capping Reaction of the Backbone Resin with Beta-Allyl Itaconate

A one-liter, three-necked round-bottomed flask was fitted with the following: a teflon stirring paddle, shaft, and bearing for a mechanical stirrer; a condenser; a thermometer; an addition funnel; an argon inlet; and an argon outlet attached to a bubbler. Under an argon atmosphere, the dried flask was charged with a solution of 190 grams of the resin backbone synthesized above in 400 milliliters ethyl acetate. To this solution, 61 grams (0.32 moles) beta-allyl itaconyl chloride was added in one portion. Then a solution of 29.1 grams (0.288 moles) triethylamine in 200 milliliters ethyl acetate was added dropwise via the addition funnel over 1.25 hours. The rate of dropwise addition was adjusted so as to maintain the reaction temperature at 30° C. The reaction was stirred for an additional 30 minutes and the triethylamine hydrochloride precipitate was removed by filtration. The organic phase was transferred to a separatory funnel and washed with 500 milliliters 3% aqueous sodium bicarbonate. The organic phase was dried over $MgSO_4$, filtered and the solvents partially removed, yielding 202 grams of a solution containing 166 grams of a capped resin (X) wherein $R'$ is allyl itaconate (AI), R is H, and the weight ratio $a:b:d:e=8:2:2:0$.

Synthesis of the Water-Soluble Resins of the Present Invention

Compound A—Maleic Anhydride (2 Equivalents)

To a solution of 50 grams of the capped resin prepared above (X) in 120 milliliters ethyl acetate, in a dry flask equipped with mechanical stirring, was added 6.86 grams (0.07 moles) maleic anhydride in one portion. The reaction was stirred at room temperature until NMR analysis indicated complete reaction of maleic anhydride (loss of peak at 7.1 ppm downfield from TMS, about 5 days). The solvent was partially evaporated to afford 73.6 grams of a solution containing 52.2 grams of compound A (R'=AI, R=half ester of maleic acid (M), a:b:d:e=8:2:2:0.

Compound B—Maleic Anhydride (1.5 Equivalents)

In a manner similar to compound A, 235 grams resin (X) in 800 milliliters ethyl acetate was treated with 24.5 grams (0.25 moles) maleic anhydride and the reaction warmed to 40°-45° C. until NMR analysis indicated complete reaction (20-40 hours). Work up as in Compound A afforded a solution of 250 grams of compound B (R'=AI, R=M, R''=H, a:b:d:e=8:2:1.5:0.5).

Compound C—Maleic Anhydride (0.7 Equivalents)

In a manner similar to Compound B, 31.2 grams resin (X) in about 50 milliliters ethyl acetate was treated with 1.57 grams (0.0156 moles) maleic anhydride, yielding a solution of 28 grams of compound C (R'=AI, R=M, R''=H, a:b:d:e=8:2:0.7:1.3).

Compound D—Maleic Anhydride (0.5 Equivalents)

In a manner similar to Compound B, 31.2 grams resin (X) in about 50 milliliters ethyl acetate was treated with 1.09 grams (0.011 moles) maleic anhydride, yielding 27.8 grams of compound D (R'=AI, R=M, R''=H, a:b:d:e=8:2:0.5:1.5).

Compound E—Maleic Anhydride (0.3 Equivalents)

In a manner similar to Compound B, 31.2 grams resin (X) in about 50 milliliters ethyl acetate was treated with 0.65 grams (0.0066 moles) maleic anhydride, yielding 26.8 grams of Compound E (R'=AI, R=M, R''=H, a:b:d:e=8:2:0.3:1.7).

Compound F—Maleic Anhydride (0.1 Equivalents)

In a manner similar to Compound B, 31.2 grams resin (X) in about 50 milliliters ethyl acetate was treated with 0.22 grams (0.0022 moles) maleic anhydride yielding 27.1 grams of Compound F (R'=AI, R=M, R''=H, a:b:d:e=8:2:0.1:1.9). Because of the low value of d, this resin, when neutralized, is not water-soluble. However, it can be used in the paint compositions of the present invention where a co-solvent is used to solubilize it.

Compound G—Phthalic Anhydride (2.0 Equivalents)

In a manner similar to Compound B, 50 grams resin (X) in 120 milliliters ethyl acetate was treated with 10.4 grams (0.07 moles) phthalic anhydride, yielding 52 grams of Compound G (R'=AI, R=half ester of phthalic acid (P), a:b:d:e=8:2:2:0).

Compound H—Succinic Anhydride (2.0 Equivalents)

In a manner similar to Compound B, 50 grams resin (X) in 120 milliliters ethyl acetate was treated with 7.0 grams (0.07 moles) succinic anhydride, yielding 51.8 grams of Compound H (R'=AI, R=half ester of succinic acid (S), a:b:d:e=8:2:2:0).

Compound I—Succinic Anhydride (1.5 Equivalents)

In a manner similar to Compound B, 156 grams resin (X) in 375 ml. of ethyl acetate was treated with 17.2 grams (0.17 moles) of succinic anhydride, yielding 161 grams of Compound I (R'=AI, R=S, R''=H, a:b:d:e=8:2:1.5:0.5).

Compound J—Itaconic Anhydride (2.0 Equivalents)

In a manner similar to Compound B, 58 grams resin (X) in about 150 milliliters of ethyl acetate was treated with 9.2 grams (0.08 moles) itaconic anhydride, yielding 52 grams of Compound J (R'=AI, R=half ester of itaconic acid (I), a:b:d:e=8:2:2:0).

As used in this example, the following abbreviations have the meanings given below.

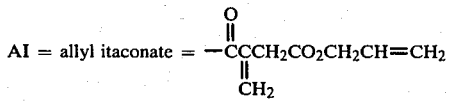

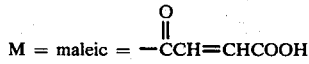

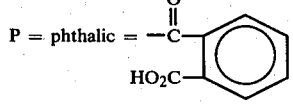

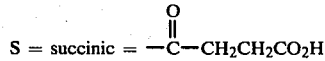

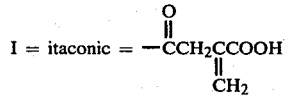

H = hydrogen

Further, using the procedures described in U.S. patent application Ser. No. 290,918, Bush and Robbins, filed Aug. 7, 1981, incorporated herein by reference, and the conventional techniques described in Sorenson and Campbell, *Preparative Methods of Polymer Chemistry*, 2nd Edition, Interscience Publishers, 1968, p. 130, also incorporated herein by reference, resins of the present invention similar to those prepared above, but wherein the olefinic pendant group is beta-vinyl itaconyl chloride and wherein the backbone component is poly(ethylene-cotrimethylolpropylene adipate), poly-(ethylene-co-pentaerythritol adipate), or polycarbonate may be prepared.

EXAMPLE II

Water-based paint formulae of the present invention, having the compositions given below, were prepared in a conventional manner. The resin in ethyl acetate was treated with a sufficient amount of lithium hydroxide to neutralize 100% of the free carboxylic acid groups and an amount of water equal to the weight of resin solids was added. The mixture was then concentrated on a rotary evaporator until all the ethyl acetate was removed to give a 50% solution of partially neutralized resin in water. To the resin solution were then added the cosolvents, ethylene glycodiacetate (EGDA) and ethanol, followed by addition of the pigment, extender and flatting agent. The reactive diluent (QM-657) and the hydrocarbon peroxide precursor of the initiator system (BDOP) were then added and the paint mixture was dispersed on a Kraft high speed mixer at about 5,000 rpm for 10 minutes. After the paint was well dispersed, the cobalt(II) compound was added and stirring was continued for an additional minute.

| Component | Weight % | |
|---|---|---|
| Resin | 24 | |
| Water | 24 | |
| TiO$_2$ | 18 | |
| Flatting silica | 5 | |
| Extender silica | 5 | |
| 1,3-bis(1,3-dioxolan-2-yl)propane (BDOP) | 2.5 | |
| QM-657 | 5 | |
| Co(II) octanoate | 1.5 | (0.15% of Co(II)) |

-continued

| | | |
|---|---|---|
| EGDA | | 12 |
| Ethanol | | 3 |
| Base | | to pH 7 |

| Composition | Resin (from Example I) | Base |
|---|---|---|
| 1 | B (maleic, 1.5) | triethylamine |
| 2 | C (maleic, 0.7) | triethylamine |
| 3 | H (succinic, 1.5) | triethylamine |
| 4 | I (succinic, 2.0) | triethylamine |
| 5 | G (phthalic, 2.0) | triethylamine |
| 6 | B (maleic, 1.5) | LiOH |
| 7 | B (maleic, 1.5) | LiOH + Ca(OH)$_2$ |

Substantially similar compositions are obtained where the resin materials contained in the above compositions are replaced, in whole or in part, by Compounds A, D, E, or J of Example I or mixtures thereof. Similar compositions are also obtained when the resin material is replaced, in whole or in part, with Compound F of Example I, and the cosolvent is appropriately adjusted to solubilize the resin.

Substantially similar compositions are also obtained when the titanium dioxide pigment component in the above compositions is replaced, in whole or in part, by zinc oxide, antimony oxide, white lead, basic lead sulfate, red iron oxide, red lead, cadmium red, basic lead silico-chromate, lead chromate, zinc chromate, yellow iron oxide, cadmium yellow, calcium plumbate, chromium oxide, lead chrome green, Prussian blue, ultramarine blue, black iron oxide, aluminum powder, zinc powder, lead powder, toluidine red, arylamide red, hansa yellow, benzidine yellow, pigment green D, phthalocyanine blue, carbon black, and mixtures thereof.

Similar compositions are also obtained wherein the hydrocarbon peroxide precursor contained in the above composition is replaced, in whole or in part, with one or more of the following compounds:

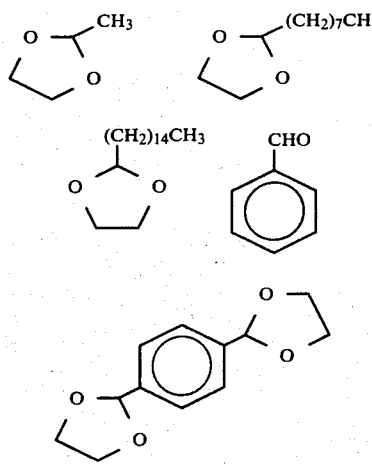

Similar compositions are also obtained where the cobalt octanoate in the above compositions is replaced, in whole or in part, with an equivalent amount of cobalt(II) dipivaloylmethane, cobalt(II) naphthenate, cobalt(II) acetylacetonate, cobalt(II) acetate, cobalt(II) decanoate, and mixtures thereof.

The paint compositions 1–7, formulated above, were applied to polyethylene scrub test panels (Leneta P-121-10N, conforming to ASTM D-2486) with a Gardner Dow Latex Film Applicator at 7 mil wet film clearance. These scrub sheets were cured at ambient temperature for 7 days and then tested for scrub and abrasion resistance using a Gardner Washability Machine, according to ASTM D-2486. Results are reported below in terms of the number of scrubs per mil film thickness until failure occurs. The pencil hardness of the films applied to the scrub panels was also tested using the standard ASTM method (#D-3363). The results of this test are also reported in the table below. These results are excellent when compared to currently available water-based paint compositions and are comparable to results achieved with commercially available solvent-based paint compositions.

| Composition | Scrubs/mil | Pencil Hardness |
|---|---|---|
| 1 | 250–500 | 2H–4H |
| 2 | 214 | HB |
| 3 | 227 | HB |
| 4 | 254 | 3H |
| 5 | 213 | 1H |
| 6 | 300 | 5H |
| 7 | 400 | 6H |

Paint compositions 1–7, described above, were also applied to aluminum Q-panels using a Gardner Ultra Film Applicator at one mil clearance. A Gardner Circular 24 hour Drying Time Recorder was then used to measure the following stages of drying: set-to-touch (no longer flows), surface-dry ("dust-free"), and through-dry ("dry-hard"). Typical drying times at these stages for the paint formulae shown were ½, 4 and 18 hours.

EXAMPLE III

Using the procedure described in Example II, a water-based paint composition of the present invention, having the following components, was formulated.

| Component | Weight % |
|---|---|
| Resin B (from Example I) - neutralized with LiOH + Ca(OH)$_2$ | 24 |
| Water | 31.5 |
| TiO$_2$ | 18 |
| Flatting Silica | 5 |
| Extending Silica | 5 |
| BDOP | 2.5 |
| QM-657 | 5 |
| Co(II) octanoate | 1.5 (0.15% of Co(II)) |
| EGDA | 6 |
| Ethanol | 1.5 |
| Base | to pH 7 |

The paint films formed by this composition exhibited outstanding strength and durability characteristics.

What is claimed is:

1. A water-soluble agent for preparing cross-linked polymers, comprising:
  (a) a major portion of a polymer selected from the group consisting of polyacrylates and, polymethacrylates, having a molecular weight of from about 1,000 to about 20,000, this portion constituting the backbone of said agent;
  (b) a minor portion of mono- or disubstituted cross-linking groups pendant from said backbone, with the unsaturated substituents on the groups being unpolymerized, said groups having polymerization rate constants between about $10 \times 10^{-4}$ and $1000 \times 10^{-4}$ mole$^{-\frac{1}{2}}$ liter$^{\frac{1}{2}}$ minute$^{-1}$ at 70° C.; and (c) a minor portion of water-solubilizing groups pendant from said backbone, said groups selected from the group consisting of the half esters of maleic acid, succinic acid, itaconic acid, phthalic acid, fumaric acid, 5-norbornene-2,3-dicarboxylic acid, citraconic acid, glutaric acid, and mixtures thereof; wherein the ratio, by weight, of pendant water-solubilizing groups to polymer backbone is from about 0.02:1 to about 1:1.

2. An agent according to claim 1 wherein the polymerization rate of the pendant cross-linking groups is from about $10 \times 10^{-4}$ to about $600 \times 10^{-4}$ mole$^{-\frac{1}{2}}$ liter$^{\frac{1}{2}}$ minute$^{-1}$.

3. An agent according to claim 2 wherein the polymerization rate of the pendant cross-linking groups is from about $30 \times 10^{-4}$ to about $600 \times 10^{-4}$ mole$^{-1/2}$ liter$^{\frac{1}{2}}$ minute$^{-1}$.

4. An agent according to claim 2 wherein the backbone is a polyacrylate.

5. An agent according to claim 2 wherein the pendant cross-linking group is selected from the group consisting of 4-methyl-2-methylenesuccinate, 4-allyl-2-methylenesuccinate, 1-vinyl-2-methylenesuccinate, p-vinylbenzoic acid, monovinyl maleate, 4-vinyl-2-methylenesuccinate, N-phenyl-2-methylenesuccinimide, substituted N-phenyl-2-methylenesuccinimides, N-alkyl-N-allyl-2-methylenesuccinamates, N,N-diallyl-2-methylenesuccinamate, and mixtures thereof.

6. An agent according to claim 4 wherein the pendant cross-linking group is selected from the group consisting of 4-methyl-2-methylenesuccinate, 4-allyl-2-methylenesuccinate, 1-vinyl-2-methylenesuccinate, p-vinylbenzoic acid, monovinyl maleate, 4-vinyl-2-methylenesuccinate, N-phenyl-2-methylenesuccinimide, substituted N-phenyl-2-methylenesuccinimides, N-alkyl-N-allyl-2-methylenesuccinamates, N,N-diallyl-2-methylenesuccinamate, and mixtures thereof.

7. An agent according to claim 6 wherein the pendant cross-linking group is selected from alpha-vinyl itaconate, beta-vinyl itaconate and beta-allyl itaconate.

8. An agent according to claim 5, wherein the pendant water-solubilizing group is the half ester of maleic acid.

9. An agent according to claim 7 wherein the pendant water-solubilizing group is the half ester of maleic acid.

10. An agent according to claim 9 wherein the ratio, by weight, of pendant cross-linking groups to polymer backbone is from about 0.05:1 to about 1:1.

11. An agent according to claim 8 wherein the ratio, by weight, of pendant water-solubilizing groups to polymer backbone is from about 0.05:1 to about 0.5:1.

12. An agent for preparing cross-linked polymers having a formula selected from the group consisting of

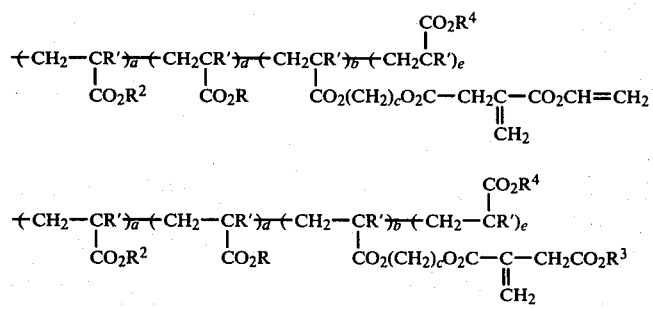

wherein R' is hydrogen or methyl, $R^2$ is $C_1$-$C_5$ alkyl; $R^3$ is vinyl or allyl; $R^4$ is $C_1$-$C_5$ hydroxyalkyl; R is selected from the group consisting of the half esters of maleic acid, fumaric acid, succinic acid, itaconic acid, phthalic acid, 5-norbornene-2,3-dicarboxylic acid, citraconic acid, glutaric acid, or mixtures thereof; a is from about 10 to about 100; b is from about 0.1a to about a; c is from about 1 to about 5; d is from about 0.1 b to about b; and e is from 0 to about b.

13. An agent according to claim 12 wherein R' is hydrogen, a is from about 16 to about 60; b is from about 5 to about 15; d is from about 1 to about 15; and e is from about 1 to about 15.

14. An agent according to claim 13 wherein R is the half ester of maleic acid.

* * * * *